(12) United States Patent
Hen et al.

(10) Patent No.: US 12,126,637 B2
(45) Date of Patent: Oct. 22, 2024

(54) ANOMALOUS AND SUSPICIOUS ROLE ASSIGNMENT DETERMINATIONS

(71) Applicant: Microsoft Technology Licensing, LLC, Redmond, WA (US)

(72) Inventors: Idan Yehoshua Hen, Tel Aviv (IL); Ilay Grossman, Tel Aviv (IL); Avichai Ben David, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 448 days.

(21) Appl. No.: 17/318,595

(22) Filed: May 12, 2021

(65) Prior Publication Data
US 2022/0368712 A1 Nov. 17, 2022

(51) Int. Cl.
*H04L 9/00* (2022.01)
*H04L 9/40* (2022.01)
*H04L 41/22* (2022.01)

(52) U.S. Cl.
CPC .......... *H04L 63/1425* (2013.01); *H04L 41/22* (2013.01); *H04L 63/102* (2013.01); *H04L 63/20* (2013.01)

(58) Field of Classification Search
CPC ... H04L 63/1425; H04L 41/22; H04L 63/102; H04L 63/20; H04L 63/10
See application file for complete search history.

(56) References Cited

U.S. PATENT DOCUMENTS

| 9,137,263 B2 * | 9/2015 | Chari | ................... H04L 63/102 |
| 10,606,987 B2 | 3/2020 | Allen | |
| 2019/0260754 A1 * | 8/2019 | Hecht | ..................... H04L 63/08 |

OTHER PUBLICATIONS

"International Search Report and Written Opinion Issued in PCT Application No. PCT/US22/025661", Mailed Date: Jul. 20, 2022, 11 Pages.
Office Action Received for European Application No. 22723285.7, mailed on Dec. 19, 2023, 3 pages.

* cited by examiner

*Primary Examiner* — Daniel B Potratz
*Assistant Examiner* — Syed M Ahsan
(74) *Attorney, Agent, or Firm* — Mannava & Kang, P.C.

(57) ABSTRACT

According to examples, an apparatus may include a processor and a memory on which is stored machine-readable instructions that when executed by the processor, may cause the processor to determine that an entity was granted an anomalous role assignment to a managed environment. The processor may also, based on the determination that the role assignment of the entity is anomalous, identify at least one indicator associated with the role assignment, determine an indicator value corresponding to the identified at least one indicator, and determine whether the indicator value exceeds a predefined threshold value. The processor may, based on a determination that the indicator value exceeds the predefined threshold value, output an alert indicating that the role assignment is suspicious.

19 Claims, 4 Drawing Sheets

ANOMALOUS AND SUSPICIOUS ROLE ASSIGNMENT DETERMINATIONS

BACKGROUND

Entities in organizations may often be granted various types of roles to resources of the organizations, which may enhance security on the resources. For instance, the organizations may employ role-based access control to their resources, in which the assigned roles may control the types of access the entities may have to various resources.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable media in which a processor may determine whether a role assignment of an entity to a managed environment is suspicious. As also discussed herein, the processor may determine whether the role assignment is suspicious after making a determination that the role assignment is anomalous. For instance, the processor may apply at least one anomaly detection model to the role assignment, e.g., to data corresponding to the role assignment, in which the at least one anomaly detection model may output an anomaly score. The processor may determine whether the anomaly score exceeds a predefined anomaly threshold score, and if so, may determine that the role assignment is anomalous. In some examples, the processor may apply a plurality of anomaly detection models that are based on various perspectives on the role assignment. In these examples, the plurality of anomaly detection models may output respective anomaly scores, which the processor may use to determine whether the role assignment is anomalous.

The processor may also determine an indicator value based on a determination that the role assignment is anomalous. The indicator value may be associated with the role assignment based on which of the plurality of anomaly detection models resulted in the determination that the role assignment is anomalous. For instance, the indicator value may be associated with an assignee of the role assignment, an assigner of the role assignment, a tenant that may have defined the role in the role assignment, a cross-tenant of a managed environment, and/or the like. The indicator value may also be based on the type of the role assignment, e.g., whether the role assignment is that of a reader assignment, an administrator assignment, an owner assignment, and/or the like, as well as other types of indicators.

The processor may determine whether the indicator value exceeds a predefined threshold value and may determine that the role assignment is suspicious based on the indicator value exceeding the predefined threshold value. Based on a determination that the indicator value exceeds the predefined threshold value, the processor may output an alert indicating that the role assignment is suspicious. For instance, the processor may output the alert to an analyst that may further analyze the role assignment to determine whether the suspicious role assignment is potentially malicious.

Through implementation of the plurality of anomaly detection models that are based on various perspectives to determine whether a role assignment is anomalous as discussed herein, the processor may more accurately determine whether the role assignment is anomalous. For instance, when analyzed from a first perspective, e.g., from a perspective of an assigner, the role assignment may not appear to be anomalous. However, when analyzed from a second perspective, e.g., from a tenant perspective, the role assignment may appear to be anomalous. In addition, by determining whether a role assignment is suspicious following a determination that the role assignment is anomalous, the number of role assignments that may improperly be determined to be suspicious may be reduced, e.g., the number of false positive determinations of suspicious role assignments may be reduced or minimized. As a result, potentially malicious role assignments may more accurately be identified, which may improve security on resources within a managed environment. Additionally, as the processor may not determine indicator values for all of the role assignments, the amount of processing and energy resources consumed by the processor may be reduced and/or minimized.

Figure 1:
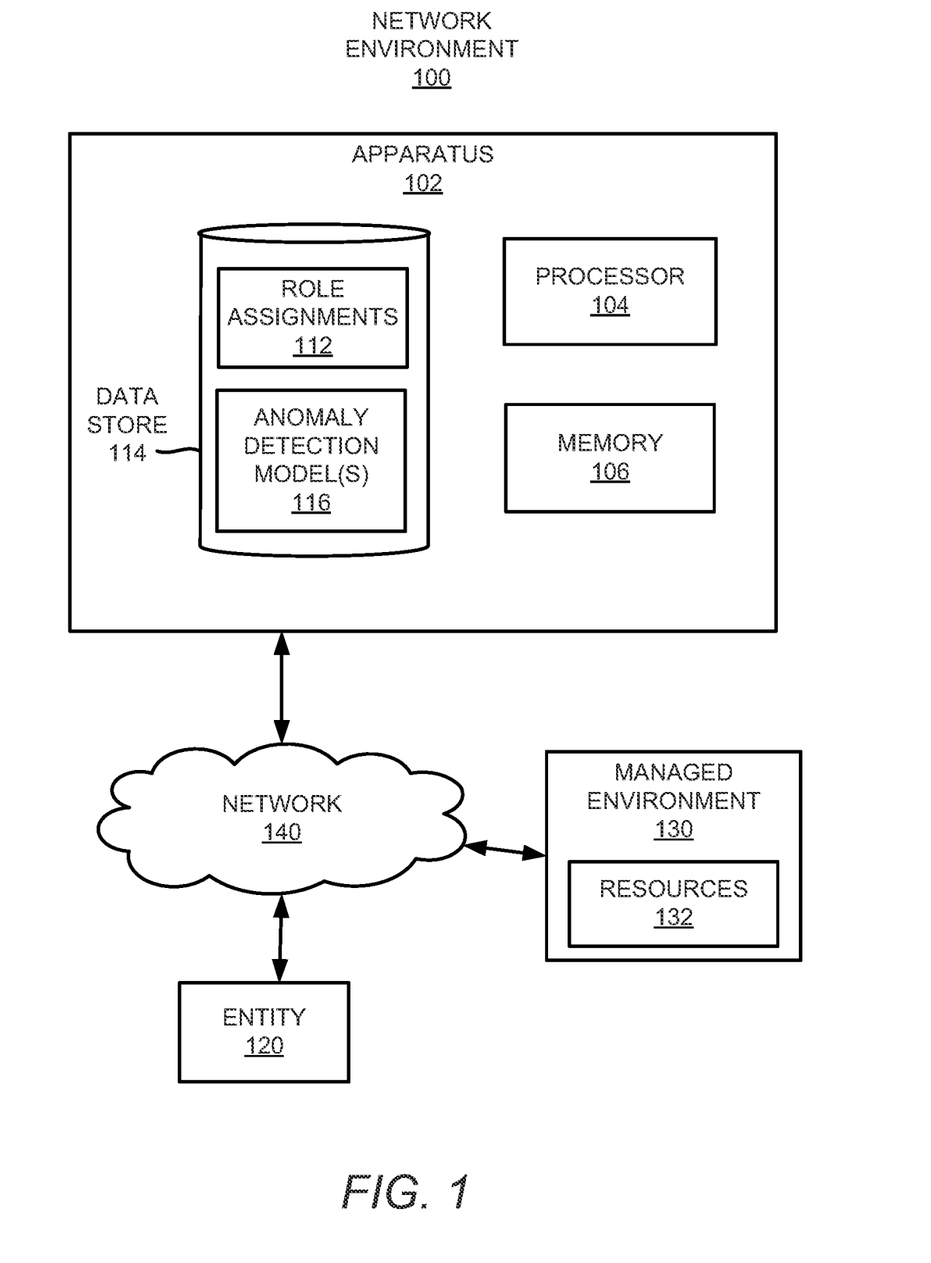
FIG. 1 shows a block diagram of a network environment, in which an apparatus may determine whether a role assignment of an entity to a managed environment is anomalous and suspicious, in accordance with an embodiment of the present disclosure.
Figure 2:
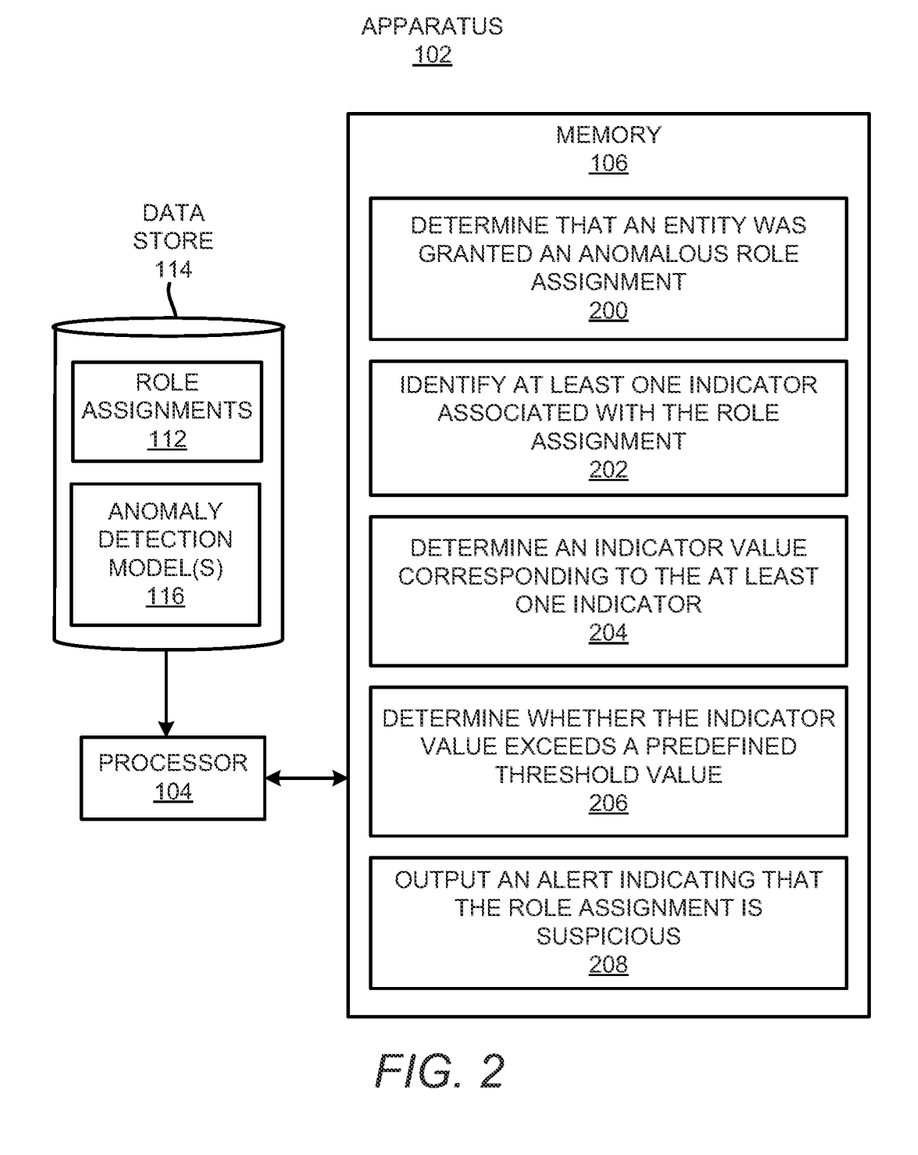
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may determine whether a role assignment of an entity to a managed environment is anomalous and suspicious, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 may include additional features and that some of the features described herein may be removed and/or modified without departing from the scopes of the network environment 100 and/or the apparatus 102.

As shown in FIG. 1, the network environment 100 may include the apparatus 102, an entity 120, and a managed environment 130. The apparatus 102 may be any type of computing device such as a server, a laptop computer, a desktop computer, a tablet computer, and/or the like. For instance, the apparatus 102 may be a server of an organization that may be located on premises with respect to the organization or may be located externally from the premises, e.g., on the cloud. In other examples, the functionalities of and/or operations that the apparatus 102 may perform may be distributed across multiple servers, multiple virtual machines, and/or the like.

The entity 120 may be a user, an account, a computer, or other type of entity that may access resources in the managed environment 130 via a network 140. The network 140 may be a local area network, a wide area network, the Internet, and/or the like. The managed environment 130 have may be an environment in which resources 132 of an organization may be stored, processed, access, managed, and/or the like. For instance, the managed environment 130 may include a number of servers, virtual machines, data stores, and other types of machines through which the resources 132 of the organization may be accessed and/or manipulated. The resources 132 of the organization may include data, applications, services, and/or the like, that members of the organization may access and/or manipulate. The resources 132 may also or alternatively include virtual machines, storage accounts, web apps, databases, virtual networks, resource groups, subscriptions, management groups, tags, and/or the like.

In some examples, the entity 120 may be granted a particular role assignment to the resources 132 in the managed environment 130. The particular role assignment may enable a certain type of access to the resources 132, may enable the entity 120 to perform various administrative functions, such as assign roles to entities, manage user access to the resource 132, manage virtual machines, create and manage virtual machines, etc. Some non-limiting examples of the roles that may be assigned to the entity 120 may include a contributor role, an owner role, a reader role, a user access administrator role, and/or the like. As such, for instance, an entity 120 that has been assigned an owner role may have full access to manage all of the resources 132 while an entity 120 that has been assigned a reader role may be view some or all of the resources 132, but may not make any changes to the resources 132.

An organization may assign roles that may have been predefined by, for instance, a cloud computing provider and/or an organization. The predefined roles may be assigned unique identifiers such that, for instance, the type of role assigned to an entity 120 may easily be identified from the identifier corresponding to the role. In other examples, some or all of the roles may be custom defined by an organization and/or other manager of the managed environment 130. In these examples, the roles may not be assigned unique identifiers and/or the types of actions that may be permissible based on the roles may not be readily identifiable. Thus, the types of actions that an entity 120 may be permitted to perform may not, in some instances, be readily identified based on the type of role assigned to the entity 120. This lack of knowledge may present security issues as a malicious actor may assign a relatively benign seeming type of role to the entity 120, in which the role may afford the entity 120 with greater levels of access to the resources 132 than the entity 120 should have.

In some instances, a malicious user who may have already attained privileged access to a victim's managed environment, may attempt to assign a privileged role to another entity, e.g., account, or the same account that the malicious user had already compromised. For instance, the malicious user may attempt to assign the privileged role to move laterally, escalate privileges, evade detections, and/or the like, while working under a privileged access permissions context. As discussed herein, the apparatus 102 may identify whether a role assignment activity is suspicious and may output an alert indicating that the role assignment activity is suspicious. An analyst or other personnel may further analyze the role assignment activity to determine whether the anomalous and suspicious role assignment activity is malicious and if so, may take an action to prevent and/or reduce potentially harmful actions that may occur through the role assignment.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-208 that the processor 104 may execute. Although the instructions 200-208 are described herein as being stored on the memory 106 and may thus include a set of machine-readable instructions, the apparatus 102 may include hardware logic blocks that may perform functions similar to the instructions 200-208. For instance, the processor 104 may include hardware components that may execute the instructions 200-208. In other examples, the apparatus 102 may include a combination of instructions and hardware logic blocks to implement or execute functions corresponding to the instructions 200-208. In any of these examples, the processor 104 may implement the hardware logic blocks and/or execute the instructions 200-208. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to determine that an entity 120 was granted an anomalous role assignment to a managed environment 130. For instance, the processor 104 may track when role assignment activities or events occur with respect to the managed environment 130. That is, for instance, the processor 104 may track or be notified whenever an entity 120 is assigned a role to the managed environment 130. By way of particular example, each time that an entity 120 is assigned a role to the managed environment 130, the processor 104 may be notified of the role assignment. As another example, the role assignment events may be added to a database and the processor 104 may access the database at regular intervals to determine when the role assignment events have occurred. In other examples, the processor 104 may function as a resource manager to the managed environment 130 and the role assignment activity or events may occur through the processor 104 and thus, the processor 104 may detect each time that a role assignment activity or event occurs. In some instances, the processor 104 may store the role assignments 112 in a data store 114. The data store 114 may be a Random Access memory (RAM), an Electrically Erasable Programmable Read-Only Memory (EEPROM), a storage device, or the like.

In some examples, the processor 104 may apply at least one anomaly detection model 116 on the role assignment (equivalently recited as a role assignment event and a role assignment activity herein) to determine whether the role assignment is anomalous. The anomaly detection model 116 may be any suitable model that may take as input, properties of a role assignment and may output an anomaly score, which may be used to determine whether the role assignment is anomalous. The properties of the role assignment may include, for instance, the type of role that was assigned, the type of entity 120 to which the role was assigned, the types of actions permitted by the assigned role, and/or the like. In addition, the processor 104 may determine that the role assignment is anomalous based on the anomaly score of the role assignment exceeding a predefined threshold anomaly score. The predefined threshold anomaly score may be user defined and/or may be based on testing, simulations, modeling, and/or the like.

The anomaly detection model 116 discussed herein may have been trained using data corresponding to the assignment of various types of roles to various types of entities. In addition, the anomaly detection model 116 may be trained using any suitable technique, such as isolation forests, k-nearest neighbor, local outlier factor, neural networks, cluster analysis, and/or the like. In some examples, the processor 104 may train one or more of the anomaly detection models 116, while in other examples, the one or more anomaly detection models 116 may have been trained by another processor (not shown).

In some examples, the processor 104 may apply a plurality of anomaly detection models 116 on the role assignment to the entity 120 to determine whether the role assignment to the entity 120 is anomalous. In these examples, the plurality of anomaly detection models 116 may include a first anomaly detection model, a second anomaly detection model, a third anomaly detection model, and a fourth anomaly detection model. Each of these anomaly detection models 116 may be trained using sets of data that are directed to various perspectives regarding the assignment of roles.

For instance, the first anomaly detection model may be based on a perspective of an assignee of the role assignment. That is, the first anomaly detection model may be trained using data that is directed to (or, equivalently, pertains to) assignees (e.g., entities) of role assignments. The first anomaly detection model may be trained to determine when a role assignment may be anomalous from the perspective of the assignee of the role assignment. In other words, the processor 104 may apply the first anomaly detection model on a role assignment to an entity 120 to determine whether the assignee of the role assignment may have operated anomalously. By way of example, the data that is directed to assignees may include data pertaining to properties of entities to which role assignments have been made. The properties of the entities may include the job titles of the entities, whether the entities are members of an organization, and/or the like. In addition, the processor 104 may determine that a role assignment is anomalous when the role assignment is made to an entity having properties that may differ from the properties of entities that are normally assigned the role assignments.

The second anomaly detection model may be based on a perspective of an assigner of the role assignment. For instance, the second anomaly detection model may be trained using data that is directed to (or, equivalently, pertains to) assigners of role assignments to entities. The second anomaly detection model may be trained to determine when a role assignment may be anomalous from the perspective of the assigner of the role assignment. In other words, the processor 104 may apply the second anomaly detection model on a role assignment to an entity 120 to determine whether the assigner of the role assignment may have operated anomalously. By way of example, the data that is directed to assigners may include data pertaining to properties of entities that grant role assignments. The properties of the entities may include the job titles of the entities, the departments of an organization to which the entities are members, the times at which the entities grant the role assignments, the types of credentials that the entities supplied to grant the role assignments, and/or the like. In addition, the processor 104 may determine that a role assignment is anomalous when the role assignment is made by an entity having properties that may differ from the properties of entities that normally assign the role assignments.

The third anomaly detection model may be based on a perspective of a tenant of the managed environment 130. For instance, the third anomaly detection model may be trained using data that is directed to (or, equivalently, pertains to) tenants of the managed environment 130, e.g., definitions of the roles used in the role assignments. The third anomaly detection model may be trained to determine when a role assignment may be anomalous from the perspective of the definition of the role in the role assignment set by a tenant. In other words, the processor 104 may apply the third anomaly detection model on a role assignment to an entity 120 to determine whether the definition of the role in the role assignment may be anomalous. By way of example, the data that is directed to tenants may include data pertaining to the types of activities that tenants may be authorized to perform based on the role assignments granted to the tenants. In addition, the processor 104 may determine that a role assignment is anomalous when the role assignment includes a definition that may differ from the definition of similar types of role assignments.

The fourth anomaly detection model may be based on a cross-tenant perspective. For instance, the fourth anomaly detection model may be trained using data that is directed to (or, equivalently, pertains to) cross-tenants. The fourth anomaly detection model may be trained to determine when a role assignment may be anomalous from the perspective of the user agent usage. In other words, the processor 104 may apply the fourth anomaly detection model on a role assignment to an entity 120 to determine whether the user agent usage in the role assignment may be anomalous. By way of example, the user agent may be a HTTP header that may be sent for most HTTP protocol-based client applications, e.g., web browsers. The user agent may contain the application that is being used to perform the role assignment request. The user agent may provide an indication for a developer of the application, e.g., web browser, that may help the developer determine how to deliver the client content in a manner that would be fitting to the client application that is being used. For instance, the training of the fourth anomaly detection model may suggest that the act of role assignment is usually performed by a particular web-browser and/or application. In addition, the processor 104 may determine that a role assignment is anomalous when the role assignment is performed by a different web-browser or application, e.g., a user used their own client application to perform the role assignment.

The first, second, third, and fourth anomaly detection models 116 discussed herein may have been trained using various types of data discussed herein. For instance, some or all of the anomaly detection models 116 may have been trained using data corresponding to the assignment of various types of roles to various types of entities, data corresponding to the definitions of roles, data corresponding to user agent usages, and/or the like. In addition, the anomaly detection models 116 may be trained using any suitable technique, such as isolation forests, k-nearest neighbor, local outlier factor, neural networks, cluster analysis, and/or the like. In some examples, the processor 104 may train one or more of the anomaly detection models 116, while in other examples, the one or more anomaly detection models 116 may have been trained by another processor (not shown).

According to examples, the processor 104 may apply each of the first, second, third, and fourth anomaly detection models 116 to the role assignment of the entity 120 to the managed environment 130. In these examples, the processor 104 may determine that the role assignment is anomalous based on application of any of the anomaly detection models 116 resulting in a determination that the role assignment is anomalous.

In some examples, the processor 104 may determine a first anomaly score of the role assignment resulting from application of the first anomaly detection model on the role assignment. That is, application of the first anomaly detection model on the role assignment may cause a first anomaly score to be outputted by the first anomaly detection model. The processor 104 may determine a second anomaly score, a third anomaly score, and a fourth anomaly score in similar manners.

In addition, the processor 104 may determine whether any of the first anomaly score, the second anomaly score, the third anomaly score, and the fourth anomaly score exceeds a respective predefined threshold anomaly score for the anomaly score. That is, the processor 104 may compare the first anomaly score with a first predefined threshold anomaly score, the second anomaly score with a second predefined threshold anomaly score, the third anomaly score with a third predefined threshold anomaly score, and the fourth anomaly score with a fourth predefined threshold anomaly score. Each of the predefined threshold anomaly scores may be user-defined, based on testing, based on simulations, based on modeling, and/or the like, and may be the same as or may differ from each other.

Based on a determination that any of the first anomaly score, the second anomaly score, the third anomaly score, and the fourth anomaly score exceeds the respective predefined threshold anomaly score for the anomaly score, the processor 104 may determine that the role assignment is anomalous. In other examples, the processor 104 may determine that the role assignment is anomalous based on a determination that two or more of the anomaly scores exceeds their respective predefined threshold anomaly scores.

The processor 104 may execute the instructions 202 to, based on the determination that the role assignment of the entity 120 is anomalous, identify at least one indicator associated with the role assignment. The at least one indicator may include data in the role assignment that may give context regarding the circumstances of the role assignment. For instance, the at least one indicator may include data pertaining to whether the role assignment event was successful, a result of the role assignment event, whether an error message was issued, and/or the like. The at least one indicator may also include data pertaining to the type of the role assignment, e.g., whether the role assignment is an owner role assignment, whether the role assignment is a reader role assignment, functions afforded by the type of role assignment, and/or the like. The at least one indicator may further include data that may be used to determine whether a role assignment event occurred under less or more secure circumstances. For instance, the at least one indicator may include data regarding whether a user entered just their password or their password and another credential, such as under a multi-factor authentication operation, in accessing an application through which the role assignment event occurred. According to examples, the processor 104 may access the data corresponding to the at least one indicator from information related to the role assignment. That is, the data corresponding to the at least one indicator may be tracked for each role assignment and the processor 104 may access that traced data.

The processor 104 may execute the instructions 204 to determine an indicator value corresponding to the identified at least one indicator. That is, for instance, each of the indicators may have been assigned a particular value and the processor 104 may determine the indicator value of the role assignment from the values assigned to the identified at least one indicator associated with the role assignment event. An administrator or other personnel may have assigned the values to the indicators.

The processor 104 may execute the instructions 206 to determine whether the indicator value exceeds a predefined threshold value. The predefined threshold value may be user-defined, based on testing, based on modeling, based on simulations, and/or the like, and may thus be varied for various scenarios. In addition, based on a determination that the indicator value exceeds the predefined threshold value, the processor 104 may determine that the role assignment is suspicious. In this case, the processor 104 may execute the instructions 208 to output an alert indicating that the role assignment is suspicious. For instance, the processor 104 may output an alert, e.g., an email message, a text message, or other type of notification, to an analyst who may analyze the role assignment in greater detail to determine whether the role assignment may potentially be malicious. The analyst may take further action with respect to the role assignment, e.g., revoke the role assignment, inform an administrator of the potentially malicious role assignment, take remedial actions, and/or the like.

In addition, or in other examples, in instances in which the processor 104 determines that the role assignment is anomalous and suspicious, the processor 104 may suspend the role assignment. That is, for instance, the processor 104 may prevent the entity 120 from accessing the resources 132 in the managed environment 130 and/or from performing administrative functions in the managed environment 130. In these examples, the entity 120 may be prevented from accessing the resources 132 and/or performing administrative functions until an analyst has determined that the role assignment is not potentially malicious.

Figure 3:
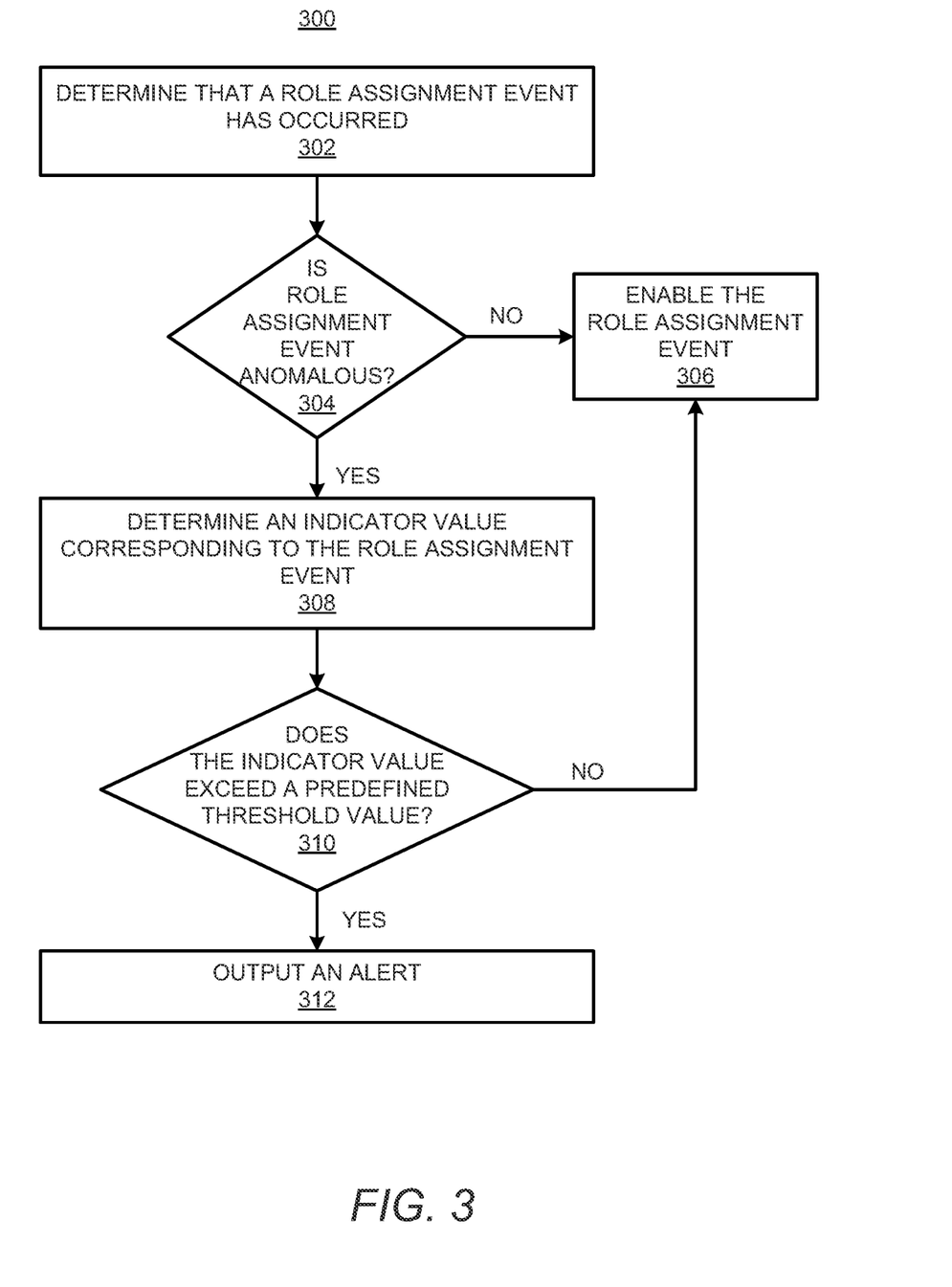
FIG. 3 depicts a flow diagram of a method for determining whether a role assignment event of an entity to a managed environment is anomalous, to determine whether the role assignment event is suspicious based on the role assignment event being determined to be anomalous, and outputting an alert based on the role assignment event being determined to be suspicious, in accordance with an embodiment of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for determining whether a role assignment event of an entity 120 to a managed environment 130 is anomalous, to determine whether the role assignment event is suspicious based on the role assignment event being determined to be anomalous, and outputting an alert based on the role assignment event being determined to be suspicious, in accordance with an embodiment of the present disclosure. It should be understood that the method 300 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 may determine that a role assignment event of an entity 120 to a managed environment 130 has occurred. The processor 104 may make this determination in any of the manners discussed herein. At block 304, the processor 104 may apply at least one anomaly detection model 116 on the role assignment event to determine whether the role assignment event is anomalous. As discussed herein, application of the at least one anomaly detection model 116 on the role assignment event may result in an anomaly score of the role assignment event. In addition, the processor 104 may determine whether the anomaly score exceeds a predefined threshold anomaly score and may determine that the role assignment event is anomalous based on a determination that the anomaly score exceeds the predefined threshold anomaly score.

According to examples, at block 304, the processor 104 may apply a plurality of anomaly detection models 116 on the role assignment event to determine whether the role assignment event is anomalous. As discussed herein, the plurality of anomaly detection models 116 may be based on various perspectives, such as, a perspective of an assignee of the role assignment event, a perspective of an assigner of the role assignment event, a perspective of a tenant of the managed environment, a perspective of a cross-tenant of the managed environment, and/or the like. In these examples, the processor 104 may determine that the role assignment is anomalous based on the application of the plurality of anomaly detection models 116 on the role assignment event resulting in the determination that the role assignment event is anomalous.

As also discussed herein, the processor 104 may determine a first anomaly score of the role assignment event resulting from application of the first anomaly detection model on the role assignment event, a second anomaly score of the role assignment event based on application of the second anomaly detection model on the role assignment event, a third anomaly score of the role assignment event based on application of the third anomaly detection model on the role assignment event, and a fourth anomaly score of the role assignment event based on application of the fourth anomaly detection model on the role assignment event. The processor 104 may determine whether any of the first anomaly score, the second anomaly score, the third anomaly score, and the fourth anomaly score exceeds a respective predefined threshold anomaly score for the anomaly score. In addition, the processor 104 may, based on a determination that any of the first anomaly score, the second anomaly score, the third anomaly score, and the fourth anomaly score exceeds the respective predefined threshold anomaly score for the anomaly score, determine that the role assignment event is anomalous.

At block 306, based on a determination the role assignment event is not anomalous, e.g., is normal, is within predefined norms, is not identified by the at least one anomaly detection model 116 as having an anomaly score that exceeds a predefined threshold anomaly score, etc., the processor 104 may enable the role assignment event. That is, the processor 104 may not determine that the role assignment event is anomalous and may not output an alert regarding the role assignment event.

However, based on a determination that the role assignment event is anomalous, at block 308, the processor 104 may determine an indicator value corresponding to the role assignment event. The processor 104 may identify at least one indicator associated with the role assignment event based on which of the plurality of anomaly detection models 116 resulted in the determination that the role assignment event is anomalous. In addition, the processor 104 may determine the indicator value from the identified at least one indicator.

The processor 104 may also, at block 310, determine whether the indicator value exceeds a predefined threshold value. Based on a determination that the indicator value falls below the predefined threshold value, the processor 104 may enable the role assignment event as indicated at block 306. That is, the processor 104 may not determine that the role assignment event is suspicious and may not output an alert regarding the role assignment event.

Based on a determination that the indicator value exceeds the predefined threshold value, at block 312, the processor 104 may output an alert indicating that the role assignment event is suspicious. As discussed herein, the processor 104 may output the alert to an analyst that may further analyze the role assignment event to determine whether the role assignment event is potentially malicious. Further action with regard to the role assignment event may be taken based on a determination that the role assignment event is potentially malicious.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
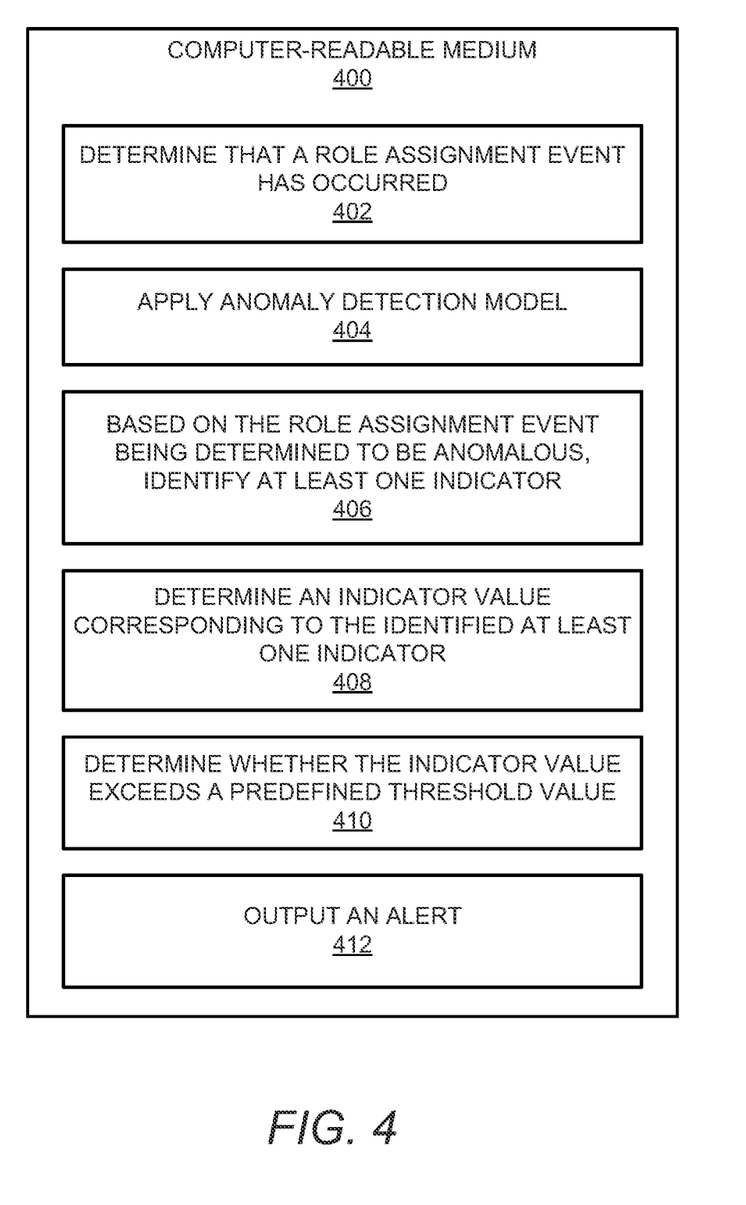
FIG. 4 shows a block diagram of a computer-readable medium that may have stored thereon computer-readable instructions for determining whether a role assignment event of an entity to a managed environment is anomalous, to determine whether the role assignment event is suspicious based on the role assignment event being determined to be anomalous, and outputting an alert based on the role assignment event being determined to be suspicious, in accordance with an embodiment of the present disclosure.

Turning now to FIG. 4, there is shown a block diagram of a computer-readable medium 400 that may have stored thereon computer-readable instructions for determining whether a role assignment event of an entity 120 to a managed environment 130 is anomalous, to determine whether the role assignment event is suspicious based on the role assignment event being determined to be anomalous, and outputting an alert based on the role assignment event being determined to be suspicious, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-412 that a processor, such as a processor 104 of the apparatus 102 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to determine that a role assignment event of an entity 120 to a managed environment 130 has occurred. The processor may fetch, decode, and execute the instructions 404 to apply at least one anomaly detection model on the role assignment event to determine whether the role assignment event is anomalous. The processor may apply a plurality of anomaly detection models that are based on various perspectives on the role assignment event to determine whether the role assignment event is anomalous as discussed herein.

The processor may fetch, decode, and execute the instructions 406 to, based on a determination that the role assignment event is anomalous, identify at least one indicator associated with the role assignment event. The processor may fetch, decode, and execute the instructions 408 to determine an indicator value corresponding to the identified at least one indicator. In addition, the processor may fetch, decode, and execute the instructions 410 to determine whether the indicator value exceeds a predefined threshold value. The processor may identify the at least one indicator associated with the role assignment event based on which of the plurality of anomaly detection models resulted in the determination that the role assignment event is anomalous. The processor may also fetch, decode, and execute the instructions 412 to, based on a determination that the indicator value exceeds the predefined threshold value, output an alert indicating that the role assignment event is suspicious.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and a memory on which is stored machine-readable instructions that when executed by the processor, cause the processor to:
   determine that an entity was granted a role assignment to resources in a managed environment;
   apply a plurality of anomaly detection models on the role assignment granted to the entity to determine whether the role assignment is anomalous, wherein the plurality of anomaly detection models are based on various perspectives of the role assignment, including a first anomaly detection model based on a perspective of an assignee of the role assignment and a second anomaly detection model based on a perspective of an assigner of the role assignment, and
   wherein the first anomaly detection model and the second anomaly detection model are trained using respective sets of learning data corresponding to the respective perspectives of the first and second anomaly detection models;
   based on a determination that the role assignment of the entity is anomalous, identify at least one indicator associated with the role assignment;
   determine an indicator value corresponding to the identified at least one indicator;
   determine whether the indicator value exceeds a predefined threshold value; and
   based on a determination that the indicator value exceeds the predefined threshold value, generate an alert that indicates that the role assignment is suspicious.

2. The apparatus of claim 1, wherein the instructions cause the processor to:
   determine respective anomaly scores of the role assignment resulting from the application of the plurality of anomaly detection models on the role assignment;
   determine whether any of the anomaly scores exceeds a predefined threshold anomaly score; and
   based on a determination that any of the anomaly scores exceeds the predefined threshold anomaly score, determine that the role assignment is anomalous.

3. The apparatus of claim 1, wherein the plurality of anomaly detection models further include:
   a third anomaly detection model that is based on a perspective of a tenant of the managed environment;
   a fourth anomaly detection model that is based on a perspective of a cross-tenant of the managed environment; and
   determine that the role assignment is anomalous based on the application of the plurality of anomaly detection models on the role assignment resulting in the determination that the role assignment is anomalous.

4. The apparatus of claim 1, wherein the instructions cause the processor to:
   determine that the role assignment is anomalous based on the application of any of the plurality of anomaly detection models on the role assignment resulting in the determination that the role assignment is anomalous.

5. The apparatus of claim 3, wherein the instructions cause the processor to:
   determine a first anomaly score of the role assignment resulting from application of the first anomaly detection model on the role assignment;
   determine a second anomaly score of the role assignment based on application of the second anomaly detection model on the role assignment;
   determine a third anomaly score of the role assignment based on application of the third anomaly detection model on the role assignment; and
   determine a fourth anomaly score of the role assignment based on application of the fourth anomaly detection model on the role assignment.

6. The apparatus of claim 5, wherein the instructions cause the processor to:
   determine whether any of the first anomaly score, the second anomaly score, the third anomaly score, and the fourth anomaly score exceeds a respective predefined threshold anomaly score; and
   based on a determination that any of the first anomaly score, the second anomaly score, the third anomaly score, and the fourth anomaly score exceeds the respective predefined threshold anomaly score, determine that the role assignment is anomalous.

7. The apparatus of claim 3, wherein, the third anomaly detection model and the fourth anomaly detection model are trained using respective sets of learning data corresponding to the respective perspectives of the third and fourth anomaly detection models.

8. The apparatus of claim 1, wherein the instructions cause the processor to: identify the at least one indicator associated with the role assignment based on one of the plurality of anomaly detection models resulted in the determination that the role assignment is anomalous.

9. A method comprising:
   determining, by a processor, that an entity was granted a role assignment to resources in a managed environment,
   applying, by the processor, a plurality of anomaly detection models on the role assignment to determine whether the role assignment is anomalous, wherein the plurality of anomaly detection models are based on various perspectives of the role assignment, including a first anomaly detection model based on a perspective of an assignee of the role assignment and a second anomaly detection model based on a perspective of an assigner of the role assignment, and
   wherein the first anomaly detection model and the second anomaly detection model are trained using respective sets of learning data corresponding to the respective perspectives of the first and second anomaly detection models;
   based on a determination that the role assignment is anomalous, determining, by the processor, an indicator value corresponding to the role assignments;
   determining, by the processor, whether the indicator value exceeds a predefined threshold value; and based on a determination that the indicator value exceeds the predefined threshold value, generating, by the processor, an alert that indicates that the role assignment is suspicious.

10. The method of claim 9, wherein the application of the plurality of anomaly detection models on the role assignment results in a plurality of anomaly scores of the role assignment, and the method further comprising:
    determining whether any of the plurality of anomaly scores exceeds a predefined threshold anomaly score; and
    determining that the role assignment is anomalous based on a determination that at least one of the plurality of anomaly scores exceeds the predefined threshold anomaly score.

11. The method of claim 9, wherein the plurality of anomaly detection models further include:
    a third anomaly detection model that is based on a perspective of a tenant of the managed environment;
    a fourth anomaly detection model that is based on a perspective of a cross-tenant of the managed environment; and
    determining that the role assignment is anomalous based on the application of the plurality of anomaly detection models on the role assignment resulting in the determination that the role assignment is anomalous.

12. The method of claim 9, wherein determining that the role assignment is anomalous further comprises:
    determining that the role assignment is anomalous based on the application of any of the plurality of anomaly detection models on the role assignment resulting in the determination that the role assignment is anomalous.

13. The method of claim 11, further comprising:
    determining a first anomaly score of the role assignment resulting from application of the first anomaly detection model on the role assignment,
    determining a second anomaly score of the role assignment based on application of the second anomaly detection model on the role assignment,
    determining a third anomaly score of the role assignment based on application of the third anomaly detection model on the role assignment, and
    determining a fourth anomaly score of the role assignment based on application of the fourth anomaly detection model on the role assignment.

14. The method of claim 13, further comprising:
    determining whether any of the first anomaly score, the second anomaly score, the third anomaly score, and the fourth anomaly score exceeds a respective predefined threshold anomaly score; and
    based on a determination that any of the first anomaly score, the second anomaly score, the third anomaly score, and the fourth anomaly score exceeds the respective predefined threshold anomaly score, determining that the role assignment is anomalous.

15. The method of claim 9, wherein determining the indicator value further comprises:
    identifying at least one indicator associated with the role assignment based on one of the plurality of anomaly detection models resulted in the determination that the role assignment is anomalous; and
    determining the indicator value from the identified at least one indicator.

16. A non-transitory computer-readable medium on which is stored computer-readable instructions that when executed by a processor, cause the processor to:
    determine that an entity was granted a role assignment to resources in a managed environments;
    apply a plurality of anomaly detection models on the role assignment to determine whether the role assignment is anomalous, wherein the plurality of anomaly detection models are based on various perspectives of the role assignment, including a first anomaly detection model based on a perspective of an assignee of the role assignment and a second anomaly detection model based on a perspective of an assigner of the role assignment, and wherein the first anomaly detection model and the second anomaly detection model are trained using respective sets of learning data corresponding to the respective perspectives of the first and second anomaly detection models;

based on a determination that the role assignment to the entity is anomalous, identify at least one indicator associated with the role assignment, determine an indicator value corresponding to the identified at least one indicator;

determine whether the indicator value exceeds a predefined threshold value; and based on a determination that the indicator value exceeds the predefined threshold value, generate an alert that indicates that the role assignment is suspicious.

17. The non-transitory computer-readable medium of claim 16, wherein the plurality of anomaly detection models further include:

a third anomaly detection model that is based on a perspective of a tenant of the managed environment;

a fourth anomaly detection model that is based on a perspective of a cross-tenant of the managed environment; and determine that the role assignment is anomalous based on the application of the plurality of anomaly detection models on the role assignment resulting in the determination that the role assignment is anomalous.

18. The non-transitory computer-readable medium of claim 17, wherein the instructions further cause the processor to:

determine that the role assignment is anomalous based on the application of any of the plurality of anomaly detection models on the role assignment resulting in the determination that the role assignment is anomalous.

19. The non-transitory computer-readable medium of claim 16, wherein the instructions further cause the processor to:

identify the at least one indicator associated with the role assignment based on one of the plurality of anomaly detection models resulted in the determination that the role assignment is anomalous.

* * * * *